May 8, 1962 E. F. ALLEN 3,033,226
VALVE
Filed Aug. 26, 1957 2 Sheets-Sheet 1
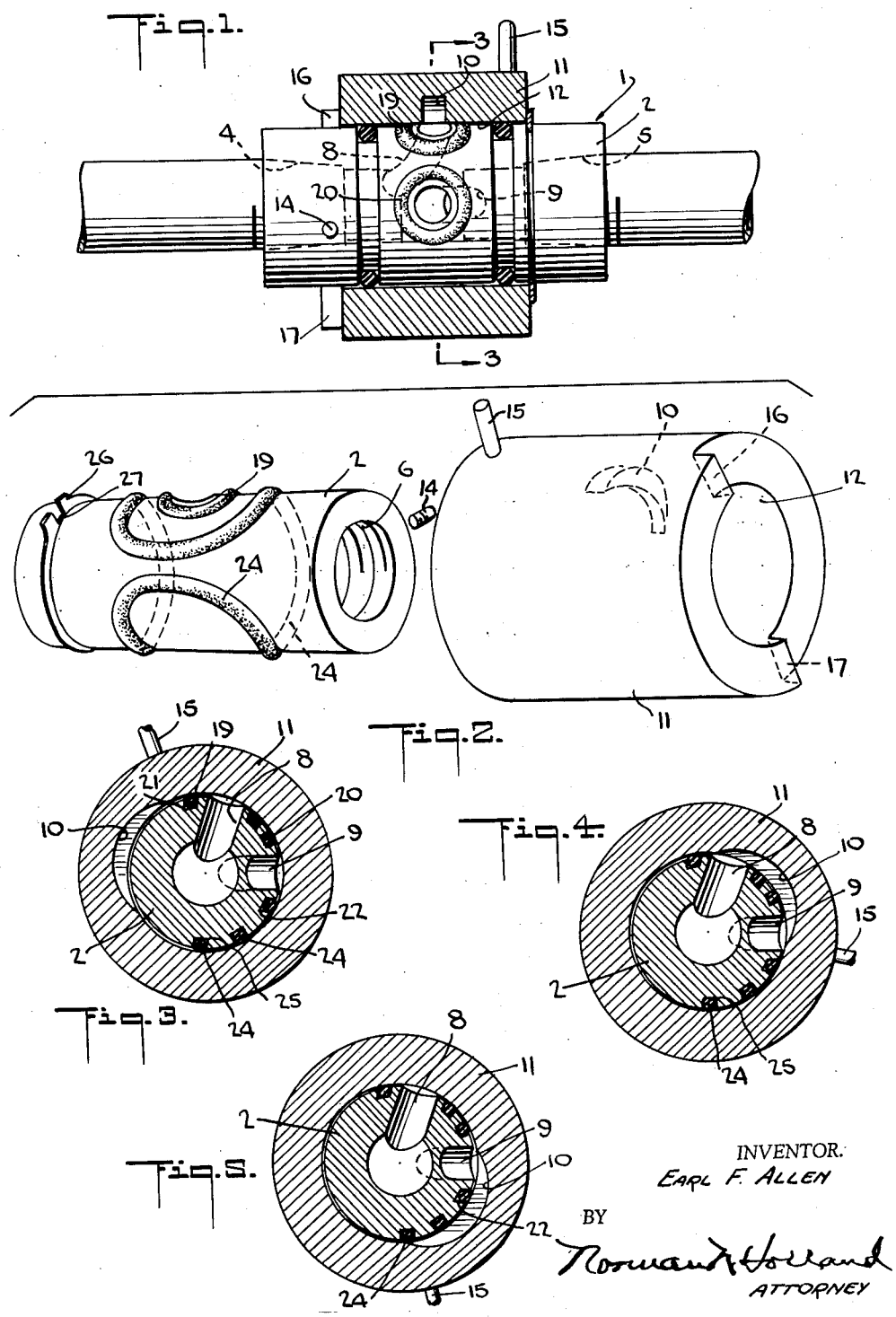
INVENTOR.
EARL F. ALLEN
BY
Norman H. Holland
ATTORNEY

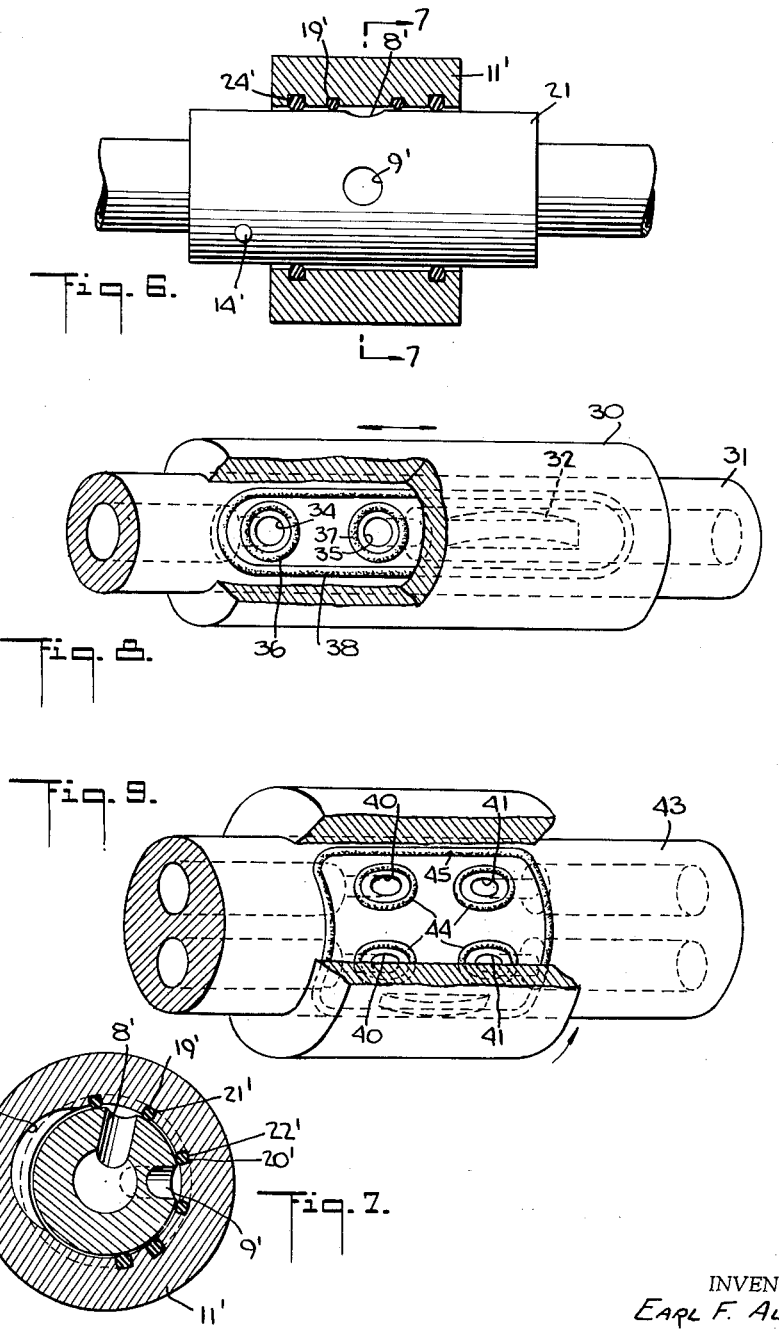

United States Patent Office 3,033,226
Patented May 8, 1962

3,033,226
VALVE
Earle F. Allen, Cross St., Norwell, Mass., assignor of one-half to Valentine E. Macy, Jr., New York, N.Y.
Filed Aug. 26, 1957, Ser. No. 680,220
8 Claims. (Cl. 137—315)

The present invention relates to valves and more particularly to an improved sleeve valve.

Sleeve valves are preferred in many piping systems as they are more compact than typical bonnet valves, however, known types of sleeve valves have several drawbacks which have tended to minimize their use in spite of their compact form.

One drawback of presently known sleeve valves is the relative complexity of the valve construction which makes automatic machining difficult. The novel design of the present valve is adapted to permit its formation and assembly by automatic machinery. The valve of the present invention is also adapted for manufacture from a wide range of materials including metals, plastics and other corrosion resistant materials. The relative simplicity of the valve and its suitability for manufacture from various inexpensive materials also makes it a relatively inexpensive valve suitable for wide use in low cost piping systems.

Another problem presented by known types of sleeve valves is the problem of replacing gaskets without removing at least one end of the valve from the line. The novel valve of the present invention has gaskets which are easily replaceable while the valve body remains connected in the line. The design is also adapted for easy cleaning and flushing of the valve parts and gaskets so that the valve may be used where system cleanliness is important.

Accordingly, an object of the present invention is to provide an improved sleeve valve.

Another object of the present invention is to provide a sleeve valve having efficient and easily replaceable gaskets.

Another object of the present invention is to provide a sleeve valve adapted for manufacture and assembly on automatic machinery.

Another object of the present invention is to provide a sleeve valve adapted for manufacture from a wide range of materials including metals and plastic.

Another object of the present invention is to provide a low-cost sleeve valve.

Another object of the present invention is to provide an easily cleaned and easily flushed valve.

Another object of the present invention is to provide a compact and efficient valve.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a side elevational view partially in section of the improved sleeve valve;

FIG. 2 is an exploded perspective view of the sleeve valve of FIG. 1;

FIG. 3 is a sectional view taken along line 3—3 of FIG. 1 with the valve in its closed position;

FIG. 4 is a sectional view corresponding to FIG. 3 with the valve in its open position;

FIG. 5 is a sectional view corresponding to FIG. 3 with the valve in position to bleed one port;

FIG. 6 is a side elevational view partially in section of another embodiment of the valve with the gaskets mounted on the valve sleeve;

FIG. 7 is a sectional view taken along line 7—7 of FIG. 6;

FIG. 8 is a perspective view of another embodiment of the valve according to the present invention; and FIG. 9 is a perspective view of another embodiment of the valve having two sets of ports.

As seen in FIGS. 1–5, the preferred embodiment of the sleeve valve 1 comprises a cylindrical valve body 2 adapted for connection to piping at its opposite ends at inlet 4 and outlet 5. The connection may be by means of threads as illustrated at 6. The inlet 4 and the outlet 5 communicate with inlet and outlet ports 8 and 9 at the central portion of the valve body. The ports 8 and 9 are adapted to be connected by a channel 10 in the rotatable sleeve 11 when the valve is in its open position and the ports are closed off by the inner surface 12 of the sleeve 11 when the valve is in its closed position. In the preferred embodiment an open channel is illustrated since this form is easily formed with regular cutting or milling tools on automatic machinery. A closed channel may also be used such as a conduit and the term channel in the specification and claims herein includes both open and closed channels. As seen in FIG. 1, the sleeve 11 is mounted rotatably on and in coaxial relation to the valve body 2. The sleeve 11 is rotated from the closed position as seen in the sectional FIG. 3 where the channel 10 is remote from the ports 8 and 9 to the open position as seen in FIG. 4 with the ports 8 and 9 facing opposite ends of the channel 10 by suitable pins 14 and 15 or by suitable hand or wrench gripping means such as knurls or angular faces. The extreme positions of the sleeve may be determined by stop surfaces 16 and 17 on sleeve 11 or by other inserted stop members which engage the stop or pin 14 on the valve body.

In order to seal the parts to prevent leakage in both the open and closed positions of the valve, resilient sealing bands are set into cooperating channels in the valve members. In the preferred embodiment as seen in FIGS. 1–5 the sealing bands are set in sealing channels formed in the valve body 2. In order to prevent leakage from the ports 8 and 9 in the closed position of the valve (FIG. 3) resilient bands 19 and 20 are inserted in channels 21 and 22 about the inlet port 8 and the outlet port 9 respectively. The sealing bands 19 and 20 are most conveniently made circular with circular cross section as seen in FIGS. 1 and 3. In this embodiment the sealing bands 19 and 20 are ring shaped and they are formed of resilient rubber-like materials. In high pressure or temperature applications the sealing bands may be made of other materials such as stainless steel tubing which can be filled with fluid under pressure to balance external pressures. Compressible rings of rubber or synthetic rubber of this shape are commonly known as O-rings. The depth of the channels 21 and 22 are made less than the diameter of the sealing band's cross section so that the sealing band protrudes above the surface of valve body 2 to resiliently engage the inner surface 12 of the sleeve 11 to thereby prevent fluid flow from the ports 8 and 9 when the sleeve is in the closed position of FIG. 3.

In order to prevent leakage from the ports when the valve sleeve is turned to its closed or an intermediate position a third gasket band 24 is mounted on the valve body 2 in a groove 25. In the preferred embodiment shown the band 24 has an elongated shape in which it encloses a greater circumferential arc on the valve body 2 than it does a longitudinal distance along the valve body 2. This shape allows the band 24 to surround the entire path of the channel 10 as it is moved between its open and its closed position while requiring a minimum band length. As best seen in FIG. 2 the band 24 does not completely encircle the valve body 2. This allows the band 24 to be replaced without the necessity of detaching the valve piping connections. The sleeve 11 need merely be slid longitudinally of the valve body 2 to expose the band 24. The sleeve 11 is freed for axial movement by either the removal of the pin 14 or the spring washer 26 which is resiliently clipped into the groove 27 in valve body 2. Thus, the longitudinal movement of the sleeve 11 permits the easy replacement of all or any one of the gasket bands 19, 20 or 24.

The embodiment of the valve shown in FIGS. 6 and 7 is generally similar to the valve of FIGS. 1–5 with the exception that the gasket bands 19′, 20′ and 24′ are mounted in grooves 21′, 22′ and 25′ in the sleeve 11′. When the sleeve is in the closed position as seen in FIG. 7 the gasket bands 19′ and 20′ surround and seal off the ports 8′ and 9′. When the sleeve 11′ is moved to its open position with the channel 10′ connecting the inlet and outlet ports 8′ and 9′ respectively the longer gasket band 24′ which surrounds the channel 10′ and the ports 8′ and 9′ prevents leakage from the valve.

Another embodiment of the sleeve valve is illustrated in FIG. 8. In this valve the sleeve 30 is slidably mounted on valve body 31 for motion longitudinally of the valve body 31. The channel 32 in the sleeve 30 moves from a closed position remote from the inlet and outlet ports 34 and 35 respectively to a position connecting the ports 34 and 35. Gasket bands 36 and 37 surrounding the ports 34 and 35 prevent leakage from the ports when the sleeve 30 is in its closed position (FIG. 8). The gasket band 38 is mounted in a suitable groove in the valve body 31 surrounding the path of the channel 32 to prevent leakage when the sleeve 30 is in its open or intermediate positions.

The embodiment of the valve shown in FIG. 9 has a pair of inlet ports 40 and a pair of outlet ports 41 which are selectively opened by rotation of the valve sleeve 42 on the valve body 43. Each of the ports has a gasket band 44 surrounding it and a larger band 45 is positioned in a suitable groove in the valve body 43 to surround all of the ports and also the connecting channel 46 when it is in its closed position as seen in FIG. 9. As in the case of the other embodiments illustrated the sleeve 42 may be slid longitudinally of the valve body 43 to provide access to the gasket bands for cleaning or replacement.

It will be seen that the present invention provides an improved valve of compact form which is adapted for manufacture and assembly on automatic machinery due to its generally concentric form and due to the relative simplicity of its ports, channels and gaskets. Also, for the same reasons the valve is adapted for manufacture from a wide variety of materials including many metals as well as plastics. The plastic form of the valve is relatively inexpensive and is suited for widespread use on inexpensive piping systems. The novel gaskets of the valve are efficient and at the same time are easily replaced and cleaned without the necessity of removing the valve body from the pipe line.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention I claim:

1. A sleeve valve comprising the combination of a substantially cylindrical body portion adapted for connection to fluid conduits at spaced points by an inlet and an outlet, a sleeve encircling and slidably mounted on said body portion for rotation circumferentially thereof and adapted for first motion between open and closed positions thereon, a first port in said body communicating with the inlet and facing an inner surface of said sleeve, a second port in said body spaced from said first port and communicating with the outlet and facing an inner surface of said sleeve, a channel in said sleeve having opposite ends facing said body portion and each of the channel ends adapted to communicate with one of said ports when said sleeve is in its open position and adapted to occupy a position spaced from said ports when said sleeve is in its closed position, resilient bands surrounding each of said ports when said sleeve is in its closed position and engaging said sleeve and said body, and a third endless resilient band enclosing a surface area of said valve body portion including both of said ports and said channel in both positions of said sleeve and engaging said sleeve and said body portion and said area excluding said inlet and outlet and releaseable sleeve anchoring means removably permitting said sleeve second motion axially of said body portion to expose one or more of said bands.

2. The sleeve valve as claimed in claim 1 in which one or more of said resilient bands are removably mounted in grooves in the surface of said valve body portion.

3. The sleeve valve as claimed in claim 1 in which one or more of said resilient bands are mounted in grooves on the inner surface of said sleeve.

4. A sleeve valve comprising the combination of an elongated body portion adapted for connection to fluid conduits at spaced points by an inlet and an outlet, a sleeve encircling and slidably mounted on said body portion for motion longitudinally thereof and adapted for first motion between open and closed positions thereon, a first port in said body communicating with the inlet and facing an inner surface of said sleeve, a second port in said body spaced from said first port and communicating with the outlet and facing an inner surface of said sleeve, a channel in said sleeve having opposite ends facing said body portion and each of the channel ends adapted to communicate with one of said ports when said sleeve is in its open position and adapted to occupy a position spaced from said ports when said sleeve is in its closed position, resilient bands surrounding each of said ports when said sleeve is in its closed position and engaging said sleeve and said body, and a third endless resilient band enclosing a surface area of said valve body portion including both of said ports and said channel in both positions of said sleeve and engaging said sleeve and said body portion and said area excluding said inlet and outlet and releasable sleeve anchoring means removably permitting said sleeve second motion axially of said body portion to expose one or more of said bands.

5. The sleeve valve as claimed in claim 4 in which one or more of said resilient bands are removably mounted in grooves in the surface of said valve body portion.

6. The sleeve valve as claimed in claim 4 in which one or more of said resilient bands are mounted in grooves on the inner surface of said sleeve.

7. A sleeve valve comprising a substantially cylindrical valve body member having an inlet and outlet, a sleeve member coaxially encircling the body member and slidably movable thereon, ports extending separately from the inlet and outlet to the outer surface of the body member, said sleeve member having a channel for establishing communication between said ports, and sealing means mounted on one of said members comprising a single endless band enclosing a surface area of said valve body member including both ports and the channel when the channel is in communicating position with the ports and said area enclosed by said band excluding said inlet and outlet and releaseable slide member anchoring means permitting the slide member to slide axially of said body member to expose said endless band for replacement when released.

8. A sleeve valve comprising a substantially cylindrical valve body member having an inlet and outlet adapted for connection to spaced fluid lines, a sleeve member encircling the body member and slidably movable thereon, ports extending separately from the inlet and outlet to the surface of the body member, said sleeve member having a channel for establishing communication between said ports, resilient sealing rings on said body member encircling said ports, a single endless sealing band on said body member enclosing a surface area of said valve body member including both ports and the channel when the channel is in communicating position with the ports and said area enclosed by said band excluding said inlet and outlet whereby said band is removable from said body while the inlet and outlet are both coupled to fluid lines.

References Cited in the file of this patent

UNITED STATES PATENTS

| | | |
|---|---|---|
| 184,573 | Becker | Nov. 21, 1876 |
| 453,109 | Dreisorner | May 26, 1891 |
| 486,722 | Loss | Nov. 22, 1892 |
| 2,304,303 | Ferguson | Dec. 8, 1942 |
| 2,433,732 | Brown | Dec. 30, 1947 |
| 2,592,062 | Perry | Apr. 8, 1952 |
| 2,604,293 | Phillips | July 22, 1952 |
| 2,644,484 | Mansen | July 7, 1953 |
| 2,873,086 | Bryant | Feb. 10, 1959 |

FOREIGN PATENTS

| | | |
|---|---|---|
| 671,915 | France | Sept. 9, 1929 |
| 1,038,027 | France | May 6, 1953 |